United States Patent [19]

Jones et al.

[11] Patent Number: 5,015,643

[45] Date of Patent: May 14, 1991

[54] DISINFECTANT FOR THE TREATMENT OF WATER SYSTEMS

[75] Inventors: Ronald L. Jones, Norcross; Marion W. Wynn, Stone Mountain, both of Ga.

[73] Assignee: Bio-Lab, Inc., Decatur, Ga.

[21] Appl. No.: 431,824

[22] Filed: Nov. 6, 1989

[51] Int. Cl.$^5$ ...................... H01N 43/66; A01N 59/08
[52] U.S. Cl. ..................................... 514/241; 424/661
[58] Field of Search ......................... 514/241; 424/661

[56] References Cited

U.S. PATENT DOCUMENTS 4,557,926  12/1985  Nelson et al. ..................... 514/241

Primary Examiner—Stanley J. Friedman
Assistant Examiner—Kevin E. Weddington
Attorney, Agent, or Firm—Rodgers & Rodgers

[57] ABSTRACT

Disclosed is a solid composition that provides hypobromous for disinfecting water systems comprising from about 80-99% trichloro-s-triazinetrione and from 1-20% potassium bromide. Also disclosed is the incorporation of a chlorine stable dye in the composition.

3 Claims, No Drawings

DISINFECTANT FOR THE TREATMENT OF WATER SYSTEMS

FIELD OF THE INVENTION

This invention relates to a composition that provides hypobromous acid for disinfecting water systems such as swimming pools, spas, decorative fountains, recirculating water cooling systems and health related baths.

1. BACKGROUND

A number of different compositions and methods that provide hypobromous acid for disinfecting water systems have been utilized. These technologies currently in use have some serious deficiencies. One of these technologies is a two part system ulitizing two products. The first product is a bromide salt solution. The second product is an oxidizing agent containing potassium peroxymonosulfate. This technology is not very efficient and difficult to use. The chemical must be hand fed.

Other technologies include blended compositions containing trichloro-s-triazinetrione (T.C.C.A.) and sodium bromide. These blends are normally pressed into a solid composition such as a stick, tablet or puck and are placed in an erosion feeder, skimmer, or a floating slow release device. An example of this type is a blend containing 96% T.C.C.A., 2% Sodium Bromide and 2% inert.

It is preferred to use the disinfectant in an erosion feeder, skimmer or a floating release device in order to slowly release the disinfectant into the water system in most applications. The sodium bromide and T.C.C.A. are compressed into either a stick, tablet or puck and use in one of the release feeder devices. However, these sticks, tablets or pucks do not maintain their integrity as water is circulated through the release device. Consequently the disinfectant splits, cracks, and breaks into small pieces. These small pieces expose more surface area and an increased rate of erosion occurs. The disinfectant is released too rapidly and is not satisfactory for the treatment of most water systems.

2. Prior Art

There are several commercial blends of sodium bromide and trichloro-s-triazinetrione available as disinfectants. There are also commercial products which use sodium bromide as the only active ingredient.

U.S. Pat. No. 4,557,926 (Nelson et al) discloses a combination of an alkali metal salt of dichloroisocyanuric acid and either sodium bromide or potassium bromide for use in disinfecting toilets. The patents which disclose the use of a bromide salt to bleach and disinfect are as follows:

3,519,569 (Diaz) issued Jul. 7, 1970
3,575,865 (Burke et al) issued Apr. 20, 1971
3,580,833 (Koceich et al) issued Nov. 26, 1974
4,235,599 (Davis et al) issued Nov, 25, 1980
4,382,799 (Davis et al) issued May 10, 1983
4,600,406 (Corte) issued Jul. 15, 1986

SUMMARY OF THE INVENTION

It is an object of the present invention to provide a solid composition that provides hypobromous acid for use in a slow release device for disinfecting water system which would dissolve at a relatively slow rate so that the disinfectant will be released uniformly into the water system over an extended period of time.

It is a further object of this invention to add an oxidizer stable dye or pigment to a slowly dissolving solid disinfectant so that it can be distinguished from solid disinfectants that would otherwise be similar in appearance. A further object of this invention is for the dye or pigment to decompose in the water system so that the water is not colored by the dye. This would be objectional to users of the water system in many cases, particularly in the case of swimming pools, as it would stain the walls and bottom surfaces of the pool.

These objects have been obtained by developing a solid disinfectant comprising from 80%-99% trichloro-s-triazinetrione (T.C.C.A.) and from 1%-20% of potassium bromide (KBr). These two disinfectants are mixed together and compressed into solid forms such as a tablet, stick or puck. The disinfectant can then be placed in a release device through which water circulates to disinfect a water system such as a swimming pool or cooling tower.

It has further been found that the pigment lazurite can be added to the composition to color the solid disinfectant. This pigment is oxidizer stable and consequently does not decompose when added to the solid disinfectant, but is decomposed by the oxidizer in the water system so that the pigment will not color the water or stain hard surfaces. This pigment is added in an amount 0.01%-0.5%. The amount of KBr or T.C.C.A. is accordingly reduced.

The disinfectant of this invention dissolves at a slower rate in release devices than comparable compositions of sodium bromide and T.C.C.A. Consequently the disinfectant of this invention adds disinfectant to a water system at a controlled and uniform rate over a long period of time.

DESCRIPTION OF THE INVENTION

This invention produces a solid disinfectant that dissolves at a slow and relatively uniform rate when placed in a release device in a water system. The disinfectant is composed of from 80%-99% trichloro-s-triazinetrione (T.C.C.A.) and from 1%-20% potassium bromide. These two compounds are in solid form and can be mixed together and pressed into a stick, tablet or puck which is suitable for use in various types of release devices such as erosion feeders, skimmers or floating release devices. Water circulates through the release device and gradually erodes the solid composition releasing hypobromous acid to serve as the disinfectant in the water system. It is preferred that from 90%-97% T.C.C.A. be used and from 3%-10% potassium bromide (KBr) be used in the composition.

In order to differentiate this solid composition from other disinfectants otherwise similar in appearance, a chlorine stable pigment has been added to the composition. This pigment is ultramarine blue or lazurite, commonly sold under the trade name Pylam Pylaklor Dry Blue TM * S-726 (Pigment Blue 29; CI 77007). It has the following composition [(Na, Ca)$_4$ (AlSi O$_4$)$_3$ (SO$_4$, S, Cl)] or [Ca$_2$Na$_6$ (Al$_6$(SiO$_4$)$_6$SO$_4$ S] or [Na$_5$ (Al$_3$(SiO$_4$)$_3$ S] or [Na$_5$ (Al$_3$(SiO$_4$)$_3$ S) (Cl). This pigment is blue, blue-violet or greenish-blue in color. Lazurite is oxidizer stable so that the solid composition is blue in color. Lazurite is decomposed by the oxidizer in the water systems. This is important for some applications as pigment would be objectionable to users of certain water systems such as swimming pools.

* Trademark of Pylam Products Company, Inc.

Lazurite is added in an amount from 0.01%–0.5% by weight. The preferred composition incorporating the pigment is as follows in parts by weight:
T.C.C.A.: 90%–97%
KBr: 3%–9.5%
Lazurite: 0.01%–0.5%

It is also possible for the formulation to include a filler. The filler is an inert substance, such as sodium chloride or boric acid, that can be used to assist in the tablettability as a composition. A filler can be used in any concentration provided the composition contains the required amount of the disinfectant. The filler is preferably present from 5%–10% by weight.

In addition to the components of the disinfectant described above, the formulation may also contain other ingredients, such as tabletting aids, e.g., mold release agents, binders, corrosion inhibitors, scale inhibitors and other components known to one skilled in the art. The tablet sticks or pucks are formed in the usual manner.

It is preferred that the disinfectant of this invention be used in a release device so that the disinfectant is immersed or partially immersed in water within an enclosure in which the disinfectant is gradually eroded and hypobromous acid are released to disinfect that water system.

Commercial solid formulations of sodium bromide and T.C.C.A. are known. The problem with these formulations is that they dissolve too rapidly in release devices as illustrated in the examples that follow. However, the combination of potassium bromide and T.C.C.A. dissolve at a much lower rate.

The solid disinfectant of this invention is useful in disinfecting water systems such as swimming pools, spas, hot tubs and cooling towers. Its composition is normally pressed into tablets, sticks or pucks and placed in a release device such as an erosion feeder, skimmer, in-line halogenator or floating release device in the system.

EXAMPLE 1

Tablets of disinfectant for this test were prepared by mixing the ingredients and pressing in a conventional tablet machine to form tablets one inch in diameter. Sticks were prepared by mixing the ingredients and forming under pressure in a conventional stick-forming machine to form one-half pound sticks.

Trichloro-s-triazinetrione in an amount of 96% parts by weight was mixed with sodium bromide in an amount of 4% parts by weight and formed into sticks and tablets. A disinfecting composition was prepared composed of 96% parts by weight trichloro-s-triazinetrione and 4% potassium bromide and formed into sticks and tablets.

These two compositions were compared placing them in a commercially available erosion control device through which water was circulated at a controlled rate of gallons per hour (gph). Water temperature was maintained at 80°–81° F. Total alkalinity of the water was controlled at 100 parts per million. The calcium hardness was at 200–300 parts per million. The pH was at 7.4 to 7.6. Tablets or sticks were put in a release device and allowed to operate until the output had stabilized. The following table shows the results.

TABLE 1

| Flow Rate (GPH) | 1" tablets 96% T.C.C.A. 4% KBr lbs $Cl_2$ per 8 hours | 1" tablets 96% T.C.C.A. 4% KBr lbs $Br_2$ per 8 hours | 0.5 lb stick 96% T.C.C.A. 4% KBr lbs $Cl_2$ per 8 hours | 0.5 lb stick 96% T.C.C.A. 4% KBr lbs $Br_2$ per 8 hours |
|---|---|---|---|---|
| 10 | 0.96 | (2.2) | 0.35 | (0.79) |
| 20 | 1.2 | (2.8) | 0.46 | (1.0) |
| 30 | 1.6 | (3.6) | 0.52 | (1.2) |
| 40 | 1.9 | (4.2) | 0.59 | (1.3) |
| 50 | 2.2 | (4.9) | 0.69 | (1.6) |

TABLE 2

| Flow Rate (GPH) | 1" tablets 96% T.C.C.A. 4% NaBr lbs $Cl_2$ per 8 hours | 1" tablets 96% T.C.C.A. 4% NaBr lbs $Br_2$ per 8 hours | 0.5 lb stick 96% T.C.C.A. 4% NaBr lbs $Cl_2$ per 8 hours | 0.5 lb stick 96% T.C.C.A. 4% NaBr lbs $Br_2$ per 8 hours |
|---|---|---|---|---|
| 10 | 1.1 | (2.5) | 0.44 | (1.0) |
| 20 | 1.5 | (3.3) | 0.58 | (1.3) |
| 30 | 1.8 | (4.0) | 0.67 | (1.5) |
| 40 | 2.1 | (4.8) | 0.80 | (1.8) |
| 50 | 2.5 | (5.7) | 0.90 | (2.0) |

In comparing the 1" tablet with KBr with those with NaBr, it will be noticed the pounds of chlorine released in an eight hour period are significantly less with the KBr than with the NaBr formulations. For example at a flow rate of 20 gallons per minute, the output rate of the formulation with the KBr is approximately 20% less than with NaBr. At 50 gallons per minute, the release of chlorine for eight hours is approximately 12% less with the KBr than with the NaBr. In comparing the sticks, it will be noticed that the release rate for the chlorine for eight hours is significantly less for the KBr formulation than for the NaBr formulation. For example at a flow rate of 40 gallons per hour, the output of chlorine for eight hours is approximately 26% less for the KBr than for the NaBr.

The bromine output for eight hours is also significantly less for sticks and tablets formed with KBr than those formed with NaBr. For example at a flow rate of 20 gallons per minute, the bromine output rate for the tablets formed with KBr was approximately 15% less than with the NaBr. The bromine output rate for these tablets at a flow rate of 50 gallons per minute was 14% less for the KBr tablets than for the NaBr containing tablets. The output rate was 20% less for the KBr sticks at 30 gallons per minute than for the NaBr sticks.

EXAMPLE 2

Tablets and sticks of 100% trichloro-s-triazinetrione were prepared in accordance with the procedure of Example 1 and tested in the same manner. The following table shows the results.

TABLE 3

| Flow Rate (GPH) | 1" tablets 100% T.C.C.A. lbs $Cl_2$ per 8 hours | 1" tablets 100% T.C.C.A. lbs $Br_2$ per 8 hours | 0.5 lb stick 100% T.C.C.A. lbs $Cl_2$ per 8 hours | 0.5 lb stick 100% T.C.C.A. lbs $Br_2$ per 8 hours |
|---|---|---|---|---|
| 10 | 1.1 | (2.5) | 0.32 | (0.72) |

TABLE 3-continued

| Flow Rate (GPH) | 1" tablets 100% T.C.C.A. lbs Cl₂ per 8 hours | 1" tablets 100% T.C.C.A. lbs Br₂ per 8 hours | 0.5 lb stick 100% T.C.C.A. lbs Cl₂ per 8 hours | 0.5 lb stick 100% T.C.C.A. lbs Br₂ per 8 hours |
|---|---|---|---|---|
| 20 | 1.7 | (3.8) | 0.40 | (0.90) |
| 30 | 2.0 | (4.5) | 0.48 | (1.1) |
| 40 | 2.3 | (5.2) | 0.56 | (1.3) |
| 50 | 2.8 | (6.3) | 0.64 | (1.4) |

In comparing the 1" tablet with 96% T.C.C.A. and 4% NaBr (Table 1) with 100% T.C.C.A. (Table 3), it will be noticed with T.C.C.A. alone. For example, at a flow rate of 20 gallons per minute the KBr tablets had a chlorine output rate that was 29% less than of the T.C.C.A. tablet alone (Table 2). The KBr sticks (Table 1) at a flow rate of 20 gallons rate per minute had a chlorine output rate that was 13% less than of the T.C.C.A. tablets (Table 2). The bromine output rate with a 1" tablet at a flow rate of 40 gallons per minute was 19% less with the KBr tablet (Table 1) than with the T.C.C.A. tablets (Table 3).

EXAMPLE 3

The disinfectant composition was prepared by mixing the following ingredients in accordance with the following formulation: T.C.C.A. 95.8%, KBr 4%, Lazurite 0.2%. These compositions were blended until a uniform blue mixture was obtained. These compositions were stored using a thirty day accelerated stability testing method at 50° C. Compositions remained blue at the conclusion of the test. The stability of the pigment in water containing an oxidizer has measured in accordance with the following procedure: 0.5 gm of the composition was added to 1000 gm of distilled water. An additional 0.1 gm of Lazurite was added for visual effect. These mixtures were allowed to mix over a 24 hour period. The color of the water immediately upon adding the composition was blue, but the water become colorless after 1½ hours and remained so at the end of the 24 hour period.

We claim:

1. A solid disinfecting composition for disinfecting water systems comprising a mixture of trichloro-s-triazinetrione of from 80%-99% by weight and potassium bromide in an amount from 1%-20% by weight said composition providing a prolonged and controlled release of hypobromous acid when immersed in water.

2. A solid disinfecting composition of claim 1 in which the trichloro-s-triazinetrione is present in an amount from 90%-97% by weight and the potassium bromide is present in an amount of from 3%-10% by weight.

3. The disinfecting solid composition of claim 1 in which the trichloro-s-triazinetrione is present in an amount from 90%-97% by weight and the potassium bromide is present from 3%-9.5% by weight and lazurite is present in an amount from 0.01%-0.5% by weight.

* * * * *